3,304,341
PROCESSES FOR SEPARATION OF OLEFINES
Hans Berthold Wiener, Alexander James Strath Sorrie, and William Featherstone, Norton-on-Tees, England, assignors to Imperial Chemical Industries Limited, London, England, a corporation of Great Britain
No Drawing. Filed Apr. 26, 1963, Ser. No. 276,077
Claims priority, application Great Britain, May 7, 1962, 17,424/62
9 Claims. (Cl. 260—677)

This invention relates to the separation of olefines.

Olefinic compounds may be separated from mixtures with other, non-olefinic compounds by contact under suitable conditions with aqueous solutions of salts of heavy metals, for example, of silver, which selectively dissolve the olefinic compounds by forming soluble complexes therewith. The solution of dissolved complex may thus be readily separated from the inert, substantially insoluble hydrocarbons and the solution may then be treated, for example by moderate heating, to liberate the olefine and regenerate the salt solution for further use. Liquid mixtures containing olefines, for example xylene mixtures containing styrene such as are obtained by dehydrogenating ethylbenzene in a $C_8$ aromatics fraction, may be contacted countercurrently with a suitable aqueous salt solution in a liquid-liquid extraction column, preferably over packing or trays providing several theoretical plates. Although in such systems equilibrium between the two liquid phases may be substantially reached, it is nevertheless usually found that the two hydrocarbon species are not completely separated into the two phases, the aqueous extract usually containing some of the non-olefinic hydrocarbons in addition to the olefines. For example, the extract from a 20% solution of styrene in xylenes contains 85 parts of styrene to 15 parts of xylenes. The present invention provides a process by means of which the separation may be made more complete.

Accordingly the present invention provides a process for separating olefinic compounds from mixtures containing non-olefinic organic compounds which comprises an extraction step in which the olefinic compound is selectively extracted with an aqueous solution of a salt of a heavy metal capable of forming complexes with olefines, a purification step in which the aqueous extract from the first step in purified by removal of the non-olefinic compounds, and a stripping step in which the olefinic compound is stripped from the purified aqueous extract and recovered and the aqueous solution is thereby regenerated.

The extent to which separation is effected in the extraction step depends upon such factors as the number of theoretical plates of the extraction column or unit, the flow rates, temperature, and upon the olefine content, if any, and silver concentration of the incoming aqueous solvent.

The purification step may consist of treatment in a column comprising several theoretical plates wherein the aqueous extract is contacted in countercurrent operation with a second phase, either by liquid-liquid extraction with another solvent or with the vapour phase by extractive distillation. The liquid raffinate or vapour, as the case may be, emerging from the top of the column is thereby enriched in the non-olefinic impurity, while the bulk of the more soluble olefinic compound remains in the aqueous phase.

Where the purification step is carried out in a liquid-liquid extraction column, the second phase is preferably an organic solvent which is substantially immiscible with the aqueous extract and which is subsequently readily separable from the soluble olefinic compound by distillation, for recycling.

Where the purification step is carried out in an extractive distillation column the vapour entering at the base of the column may be generated by reboiling the descending liquid, or preferably by admitting steam or another suitable vapour or gas from an external source. The use of externally generated vapour is preferable because the minimum equipment should be exposed to the boiling aqueous extract, which is usually highly corrosive. In any case it is usually preferable to add steam to replace the water vapour leaving the top of the distillation column in order to maintain a constant concentration of heavy metal salt in the aqueous solvent.

The stripping step in the process according to the invention may be effected in a still in which the free olefinic compound is stripped from the purified aqueous extract by direct contact with steam, preferably admitted as vapour into the still, in countercurrent flow over one or more theoretical plates. The use of externally generated steam is preferred for the same reasons as in the case of the purification column. Alternatively, the stripping step may be effected in a liquid-liquid extraction column, by contact with an immiscible organic solvent which may be subsequently readily removed from the olefine by distillation. This method has the particular advantage that the aqueous extract is not exposed to the elevated temperatures normally necessary for stripping the free olefinic compound by decomposition of the complex, which aggravate corrosive effects of the extract.

It is convenient to carry out purification and stripping by similar techniques, that is to say, by liquid-liquid extraction or extractive distillation methods.

The feed is preferably added at a plate of the extraction column at which the composition of the raffinate matches that of the feed, but it may be added at any point of the extraction or purification columns above the lowest plate of the latter. Where distillation is employed in the purification step, the feed is preferably not added at a point below the top of the purification column, in order to avoid phase separation on plates above the feed point.

The aqueous extract may be a solution of any suitable heavy metal salt, preferably a silver salt, and particularly silver fluoborate and silver fluosilicate, either alone or in combination with one another or with other soluble salts. The solution may be in water alone, or in an aqueous mixture with a suitable organic adjunct such as acetonitrile.

Instead of three separate columns, the process according to the invention may be carried out in various combinations of columns, and in particular the purification and stripping columns may be two successive sections of a single column.

The operating pressures of the steps in the process may be alike or different, and may be at atmospheric or other pressure. For example, a volatile solvent such as butane may be used in the stripping step under liquefying pressure and after separation from the product in the raffinate, supplied as a vapour to the purification step under a lower pressure, for removing residual non-olefinic hydrocarbons from the aqueous extract into the vapour phase.

Suitable solvents for use in the purification and stripping steps include, for example, aromatic hydrocarbons such as benzene, toluene and xylene and more particularly, since they are less soluble in the aqueous silver solution than aromatics, paraffins such as butane, and higher paraffins such as pentane, octane, decane and dodecane. In order to effect a transfer in the purification step of non-olefines from the silver solution to the organic solvent phase, the solvent should initially contain olefine, preferably the same as that extracted, or one which is readily separable therefrom, the amount of olefine in the solvent being determined by the partition constant of the system. The process is applicable to the separation of olefines from paraffins, substituted olefines such as styrene from aromatic hydrocarbons, vinyl-containing acids, esters and similar derivatives from saturated derivatives.

*Example*

In this example, styrene was separated from a $C_8$ aromatics fraction.

A stream of a 70% by weight aqueous solution of silver fluoborate flowed in turn at 23° C. through three liquid-liquid extraction columns, each having 10 theoretical plates and operated at substantially atmospheric pressure. The columns comprised extraction, purification and stripping steps. The solution was then recirculated to the first column. The mixture of styrene with xylenes, obtained by dehydrogenating the ethyl benzene in a $C_8$ aromatics fraction and containing about 20% by weight of styrene, was added in the proportion 1:1 by volume of the extract flow to a convenient plate near the bottom of the first column. Benzene was admitted at the bottom of the third column in the proportion of about 1.5:1.0 by volume of the extract flow.

The raffinate from the top of the first extraction column contained chiefly xylenes, but also about 1% by weight styrene. In this particular example the styrene content was 1% by weight.

A mixture of benzene and the $C_8$ fraction richer, however, in the non-olefines, emerged from the top of the second, purification column, and was distilled to recover benzene, which was recycled into the system, and a mixture of styrene and the other hydrocarbons, mainly xylenes, which was recycled into the base of the extraction column.

A raffinate containing benzene and substantially pure styrene emerged from the top of the third, stripping column and was distilled to recover pure styrene and benzene. The benzene was recycled into the system. The styrene was recovered in 75% yield and was 99.5% pure. The remainder of the raffinate from the third column was admitted as solvent to the base of the purification column.

The organic solvent in the stripping step may be a paraffin, or may be substituted by steam admitted to the base of the stripping and purification columns. In the latter event the condensed overheads of the purification and stripping columns then separate into organic and aqueous layers which are separated by decantation. The organic layer from the purification column is recycled to the extraction column; the organic layer from the stripping column is the purified styrene product, which may be further treated, for example, dried, by conventional methods.

We claim:

1. In a process for separating olefinic compounds from a mixture containing olefinic and non-olefinic organic compounds by:
   (a) a selective extraction step with an aqueous solution of silver fluoborate or silver fluosilicate to give an aqueous extract,
   (b) a stripping step to recover said olefinic compound from said aqueous extract and thereby regenerate said solution,
the improvement which comprises a purification step, after said selective extraction step and before said stripping step, to purify said aqueous extract, said purification step being carried out by a liquid extraction with a solvent different from that used in said selective extraction step or by an extractive distillation.

2. A process as claimed in claim 1 in which said stripping step and purification step are carried out by the same technique.

3. A process as claimed in claim 2 in which the stripping step and purification step are carried out by liquid-liquid extraction with an immiscible solvent, the solvent for the purification step comprising raffinate from the stripping step.

4. A process as claimed in claim 2 in which the stripping step and purification step are carried out by liquid-liquid extraction using a hydrocarbon solvent.

5. A process as claimed in claim 4 in which the hydrocarbon solvent is a paraffin.

6. A process as claimed in claim 1 in which the purification step is carried out by an extractive distillation using externally generated steam.

7. A process as claimed in claim 1 in which the stripping step is carried out by liquid-liquid extraction with an immiscible solvent.

8. A process as claimed in claim 1 wherein the stripping step is carried out by extractive distillation.

9. A process as claimed in claim 1 in which the stripping step is carried out by liquid-liquid extraction with an immiscible solvent and the purification step is carried out by an extractive distillation with a volatile solvent, said volatile solvent and said immiscible solvent are the same material and being used in the stripping step under liquefaction pressure and used under vaporising pressure in the purification step.

References Cited by the Examiner

UNITED STATES PATENTS

| | | | |
|---|---|---|---|
| 2,458,067 | 1/1949 | Friedman et al. | 260—677 |
| 2,913,505 | 11/1959 | Raay et al. | 260—677 |
| 3,007,981 | 11/1961 | Baker et al. | 260—677 |
| 3,125,611 | 3/1964 | Monroe | 260—677 |

ALPHONSO D. SULLIVAN, *Primary Examiner.*